United States Patent
Aune (10) Patent No.: US 11,620,174 B2
(45) Date of Patent: Apr. 4, 2023

(54) AUTONOMOUS TRANSMIT ERROR DETECTION OF SERIAL COMMUNICATION LINK RECEIVER-TRANSMITTER AND MICROCONTROLLER SYSTEM PERIPHERALS IMPLEMENTING THE SAME

(71) Applicant: Microchip Technology Incorporated, Chandler, AZ (US)

(72) Inventor: Amund Aune, Trondheim (NO)

(73) Assignee: Microchip Technology Incorporated, Chandler, AZ (US)

(*) Notice: Subject to any disclaimer, the term of this patent is extended or adjusted under 35 U.S.C. 154(b) by 85 days.

(21) Appl. No.: 16/948,135

(22) Filed: Sep. 3, 2020

(65) Prior Publication Data

US 2021/0200615 A1    Jul. 1, 2021

Related U.S. Application Data

(60) Provisional application No. 62/954,144, filed on Dec. 27, 2019.

(51) Int. Cl.
  *G06F 11/07* (2006.01)
  *G06F 13/42* (2006.01)
  *G06F 11/30* (2006.01)

(52) U.S. Cl.
  CPC ...... *G06F 11/0751* (2013.01); *G06F 11/0745* (2013.01); *G06F 11/0772* (2013.01); *G06F 11/3027* (2013.01); *G06F 11/3041* (2013.01); *G06F 11/3079* (2013.01); *G06F 11/3096* (2013.01); *G06F 13/4282* (2013.01)

(58) Field of Classification Search
  CPC ............ G06F 11/0751; G06F 11/0745; G06F 11/0772; G06F 11/3027; G06F 11/3041; G06F 11/3079; G06F 11/3096; G06F 13/4282
  See application file for complete search history.

(56) References Cited

U.S. PATENT DOCUMENTS

| | | | | |
|---|---|---|---|---|
| 2003/0226065 A1* | 12/2003 | Shingaki | ................. | H04L 1/243 714/43 |
| 2014/0365832 A1* | 12/2014 | Neeb | ................... | G06F 11/0751 710/310 |
| 2018/0359060 A1* | 12/2018 | Kim | ........................ | H04L 1/244 |

OTHER PUBLICATIONS

Microchip Technology Inc., tinyAVR® 1-series, ATtiny417/817, 2019, p. 335.
International Search Report for International Application No. PCT/US2020/070495, dated Nov. 9, 2020, 4 pages.
International Written Opinion for International Application No. PCT/US2020/070495, dated Nov. 9, 2020, 6 pages.

* cited by examiner

*Primary Examiner* — Bryce P Bonzo
*Assistant Examiner* — Michael Xu
(74) *Attorney, Agent, or Firm* — TraskBritt (57) ABSTRACT

A serial communication link receiver-transmitter with autonomous transmission error detection is described, and a communication peripherals including the same. Transmit data at a transmitter and transmitted data output by the transmitter and received by the receiver are observed by an error detector configured to generate an error indication in response to difference between the transmit data and corresponding observed transmit data of a transmitted data frame. If a difference is detected a transmit error indicator is asserted.

21 Claims, 6 Drawing Sheets

AUTONOMOUS TRANSMIT ERROR DETECTION OF SERIAL COMMUNICATION LINK RECEIVER-TRANSMITTER AND MICROCONTROLLER SYSTEM PERIPHERALS IMPLEMENTING THE SAME

CROSS-REFERENCE TO RELATED APPLICATION

This application claims the benefit of the priority date of U.S. Provisional Patent Application No. 62/954,144, filed Dec. 27, 2019, and titled "TRANSMIT ERROR DETECTION AND MICROCONTROLLER SYSTEMS IMPLEMENTING THE SAME," the disclosure of which is incorporated herein in its entirety by this reference.

FIELD

Embodiments discussed herein relate, generally, to serial communication. More specifically, some embodiments relate to transmit error detection at receiver-transmitter, and circuitry for the same that may operate autonomously, without oversight by, or interruption of, a central processing unit.

BACKGROUND

Microcontrollers often include peripherals that may be configured to perform various tasks. Non-limiting examples of peripherals include peripherals for serial communication, analog-to-digital signal conversion, threshold detection, counters, interrupt control and timers.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is described or depicted as a flow process, flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

In this description the term "coupled" and derivatives thereof may be used to indicate that two elements co-operate or interact with each other. When an element is described as being "coupled" to another element, then the elements may be in direct physical or electrical contact or there may be intervening elements or layers present. In contrast, when an element is described as being "directly coupled" to another element, then there are no intervening elements or layers present. The term "connected" may be used in this description interchangeably with the term "coupled," and has the same meaning unless expressly indicated otherwise or the context would indicate otherwise to a person having ordinary skill in the art.

When a serial communication device (e.g., a Universal Synchronous/Asynchronous Receiver/Transmitter (USART)) transmits to a TX line, external forces may disturb the line and the transmit data. As non-limiting examples, there may be cross-talk from another device transmitting on the same line or a physically near line, or there may be electromagnetic interference (EMI). In some instances, the effects of such disturbances may corrupt the signals carrying the transmit data to such an extent that it would be time consuming or even impossible to recover the messages in the transmit data.

One or more embodiments relate, generally, to autonomous transmit error detection of a serial communication link receiver-transmitter. An error detector is arranged to observe transmit data on a transmit data path and to observe corresponding transmit data of a transmitted data frame on a serial communication link. The error detector is configured to generate an error indication in response to a difference between the observed data on the transmit data path and corresponding transmitted data. A user informed by the error indication may take any appropriate action. In one or more embodiments, disclosed transmit error detection may be performed substantially autonomously during data transmission by a serial communication link receiver-transmitter. Stated another way, autonomous transmit error detection may be performed by a serial communication link receiver-transmitter, including without limitation during a normal data transmission mode, substantially without initiation by, interruption of, or intervention by a central processing unit of a computing system (e.g., a microcontroller system, without limitation) that includes such a serial communication link receiver-transmitter.

Figure 1:
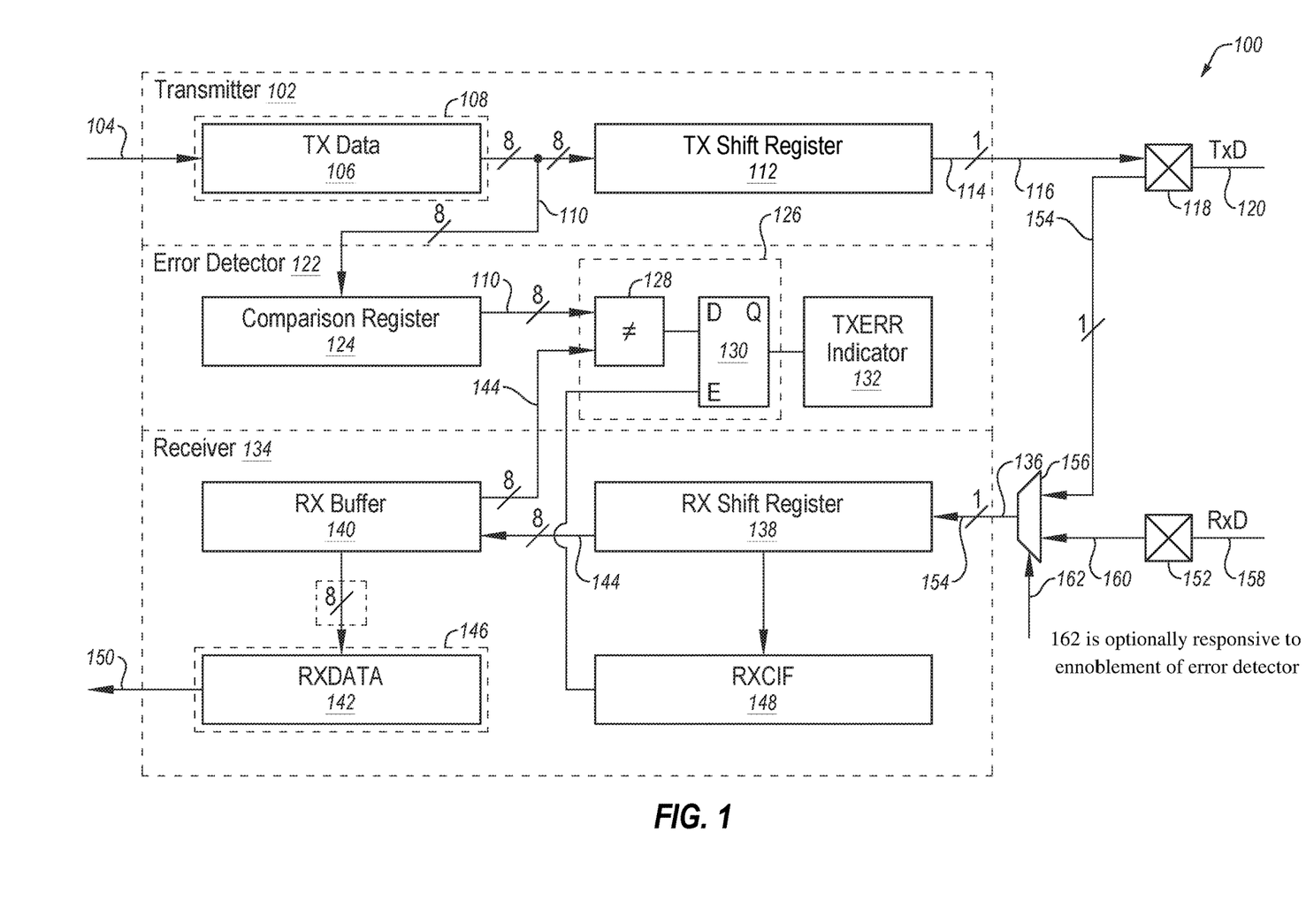
FIG. 1 is a block diagram of a communication peripheral in accordance with one or more embodiments.

FIG. 1 is a diagram depicting a serial communication link receiver-transmitter 100 configured to detect certain transmission errors, in accordance with one or more embodiments.

As depicted by FIG. 1, serial communication link receiver-transmitter 100 includes at least three functional blocks: a transmitter 102 that forms at least a portion of a transmitter input 104, a receiver 134 that forms at least a portion of a receiver output 150, and an error detector 122.

Transmitter 102 and receiver 134 may be arranged, generally, to handle serial transmission of data sent from, and reception of data sent to, serial communication link receiver-transmitter 100, respectively.

Transmitter 102 may be configured, generally, to receive transmit data 106 ("TX data 106") that is conveyed to transmitter input 104 in a parallel form and to provide transmitted data frame 116 at transmitter output 114 in a serial form, i.e., sequentially output transmitted data frame 116 one bit at a time. Transmitter 102 includes transmit data register 108 for storing transmit data 106 received at transmitter input 104 and transmit shift register 112 for handling conversion of transmit data 106 from parallel to serial form. Transmit shift register 112 shifts out bits of transmitted data frame 116 to transmitter output 114. Transmit line 120 ("TxD 120") receives transmitted data frame 116 via transmit pad 118 which is operatively coupled to transmitter output 114 and to transmit line 120. As discussed above, transmitted data frame 116 should include at least transmit data 106, and inclusion of additional bits such as timing bits and error correction bits inserted when framing transmit data 106, without limitation, do not exceed the scope of this disclosure.

Receiver 134 may be configured, generally, for serial reception of a frame of data, here received data frame 160, at receiver input 136, and for output of received data 142 in parallel form at receiver output 150. In other words, receiver 134 may be configured for typical reception of a data frame during serial communication. Moreover, receiver 134 may be configured, generally, for serial reception of observed transmitted data frame 154 at receiver input 136 and storage of observed transmitted data 144 at receive buffer 140 for transmission error detection as discussed herein.

Receiver 134 may be arranged to receive an observed transmitted data frame 154 that corresponds to a transmitted data frame 116. In one or more embodiments, observed transmitted data frame 154 may correspond to an instance of transmitted data frame 116 at any desired portion of a transmission path, such as at transmitter output 114, transmit pad 118, along transmit line 120, and any portion there between. In the specific non-limiting embodiment depicted by FIG. 1, receiver 134 is arranged to receive observed transmitted data frame 154 that corresponds to an instance of transmitted data frame 116 at transmit pad 118, and more specifically, receiver input 136 of receiver 134 is operatively coupled to transmit pad 118 via selection circuitry 156 discussed later.

Receiver 134 may include receive shift register 138 for converting received data frame 160 and observed transmitted data frame 154, as the case may be, from a serial form to a parallel form (i.e., for converting to received data 142 or observed transmitted data 144, respectively) and received data register 146 for storing received data 142 and/or observed transmitted data 144. In the specific non-limiting embodiment of receiver 134 depicted by FIG. 1, receiver 134 includes optional receive buffer 140 arranged on the data path between receive shift register 138 and received data register 146. Receive buffer 140 may be included to hold a block of data and thereby provide an application additional time to read a previous block of data from received data register 146. In the specific non-limiting embodiment of receiver 134 depicted by FIG. 1, receive buffer 140 is included and is operatively coupled to error detection logic 126. In one or more other embodiments, receive buffer 140 may, or not, be included and if not included, received data register 146 may store observed transmitted data 144 and error detection logic 126 may be operatively coupled to received data register 146.

Error detector 122 is configured, generally, to receive two data blocks and to assert a transmit error indicator 132 when the two data blocks are different. In the specific non-limiting example depicted by FIG. 1, error detector 122 is arranged to receive observed transmit data 110 from an input of transmit shift register 112 operatively coupled to error detector 122, and to receive observed transmitted data 144 from receive buffer 140 operatively coupled to error detector 122. In some embodiments, a tap type connection may operatively couple bits of transmit data 106 to bit locations of comparison register 124. By way of a non-limiting example, such a tap type connection may be formed between lines of a communication bus operatively coupling transmit data register 108 and transmit shift register 112 and comparison register 124. By way of another non-limiting example, such a tap type connection may be formed directly between bit locations of transmit data register 108 and comparison register 124 and latched in when transmit data 106 is shifted to transmit shift register 112.

During a transmission by serial communication link receiver-transmitter 100, contents of comparison register 124 may be the same as contents of transmit data register 108 (i.e., store the same data).

Error detector 122 includes comparison register 124 arranged to receive and store observed transmit data 110 and error detection logic 126 that is arranged to assert transmit error indicator 132 when contents of receive buffer 140 and contents of comparison register 124 are different. Error detection logic 126 includes difference logic circuitry 128, configured to perform bit level compare of two data blocks (here, observed transmit data 110 stored at comparison register 124 and observed transmitted data 144 stored at receive buffer 140) and output a TRUE if, and only if, the two data blocks are different and thereby assert transmit error indicator 132. Generally speaking, comparison by error detection logic 126 and/or assertion of transmit error indicator 132 may be performed when all of the bits of observed transmit data 110 and observed transmitted data 144 are present at respective inputs of error detection logic 126.

In one or more embodiments, error detection logic 126 may be configured to control timing of a comparison and/or assertion of transmit error indicator 132. In the specific non-limiting embodiment depicted by FIG. 1, an output of difference logic circuitry 128 is coupled to a data input D of latch 130 having a latched output Q coupled to an input of transmit error indicator 132. When enable input E of latch 130 is asserted, data input D is latched and presented at latched output Q. A reception complete indicator 148 may be operatively coupled to enable input E of latch 130. When reception complete indicator 148 is asserted (e.g., output changes from a "0" to "1") and its output is received at enable input E of latch 130, the comparison result output by difference logic circuitry 128 is latched at latched output Q. As non-limiting examples, when reception complete indicator 148 is de-asserted the transmit error indicator 132 may be reset by internal logic or a user of transmit error indicator 132. In one non-limiting embodiment, when reception complete indicator 148 is de-asserted, latch 130 is reset, thereby de-asserting transmit error indicator 132. As non-limiting examples, the reception complete indicator 148 may be reset by receiver logic (not shown) by way of non-limiting examples, at the start of the next data reception or when received data register 146 is read by a central processing unit.

In this manner, a difference result may be provided to an output of error detection logic 126 and assert transmit error indicator 132 until an enable input E of latch 130 is toggled. Any suitable technique known to those having ordinary skill in the art may be used to clear latch 130.

Notably, in a case of a data reception, reception complete indicator 148 may signal to a user of serial communication link receiver-transmitter 100 that there is valid data to read at received data register 146. In a transmission error detection use case, reception complete indicator 148 may be suppressed by serial communication link receiver-transmitter 100 responsive to an asserted transmit error indicator 132 such that asserted reception complete indicator 148 is received at error detection logic 126 but not received or readable external to serial communication link receiver-transmitter 100 (e.g., by a user of serial communication link receiver-transmitter 100, without limitation).

Selection circuitry 156 is arranged to selectively provide one of received data frame 160 or observed transmitted data frame 154 to receiver input 136. A first input of selection circuitry 156 is operatively coupled to receive line 158 via input pad 152, and a second input of selection circuitry 156 is operatively coupled to transmit pad 118. Selection circuitry 156 is configured to provide one of the first and second input in response to selection signal 162.

In one or more embodiments, communication by serial communication link receiver-transmitter 100 may be performed using a same (e.g., one-wire mode) or different lines for transmit line 120 and receive line 158. Additionally or alternatively, communication by serial communication link receiver-transmitter 100 may be performed using simplex (in one direction without simultaneous reception), full duplex (sending/receiving devices send and receive at the same time, simultaneously), and half duplex (sending/receiving devices alternately transmit and receive). In a case of one-wire mode, receiver 134 receives data from the same line that transmitter 102 transmits on, i.e., transmit line 120 and receive line 158, are the same.

When error detection on transmitter 102 is desired, selection circuitry 156 may be controlled via selection signal 162 to provide observed transmitted data frame 154 to receiver 134. Another connection (not shown) may provide selection signal 162 to an enable input of error detector 122 (not shown) such that observed transmitted data frame 154 is selected by selection circuitry when error detector 122 is enabled.

Some communication devices, such as universal asynchronous receiver-transmitters (UARTs), without limitation, have a feature for coupling a transmitter output to a receiver. In a specific non-limiting case of a UART it may be referred to as "loop-back-mode" (LBM). For example, enabling LBM (e.g., by setting a control bit, without limitation) activates LBM logic that is configured to operably couple the output of a transmitter of a UART to an input of a receiver of the UART and disconnects a receive data pad from the input of the receiver of the UART. In some embodiments, selection circuitry 156 and a connection carrying observed transmitted data frame 154 may include an LBM type circuitry of a serial communication link receiver-transmitter 100 that is configured to be enabled/disabled. Some conventional UARTs include LBM for so called "one-wire mode," a mode of one-wire half duplex communication. When enabled, LBM connects a transmit pad to a receiver, internally. In some such devices, when a LBM is enabled a central processing unit (CPU) may read the contents of received data register 146 and compare received data 142 with transmit data 106. Error detection performed by error detector 122 may be implemented in an autonomous hardware module such as in a microcontroller peripheral, and autonomously read contents of received data register 146 and autonomously compares received data 142 with transmit data 106.

Figure 2:
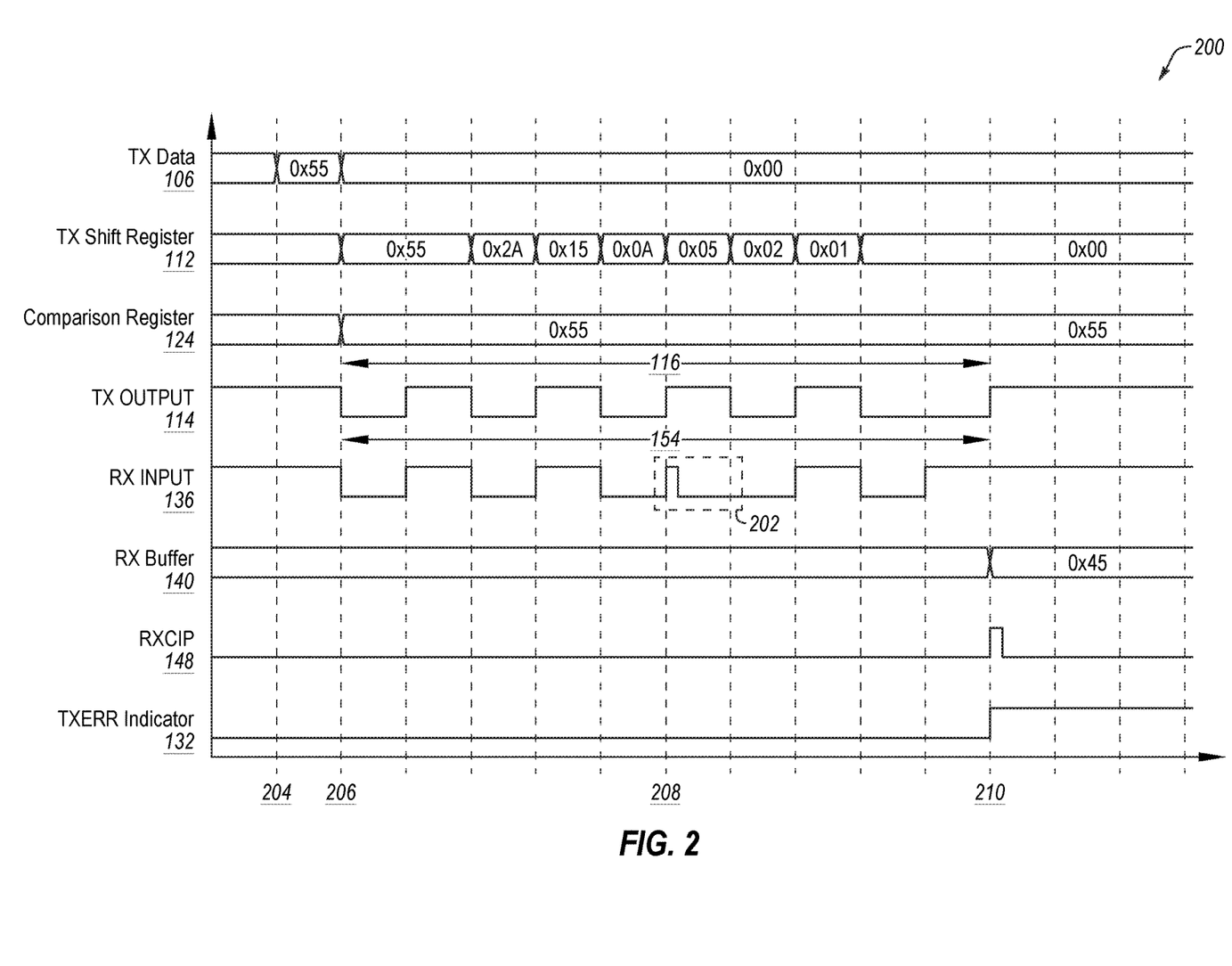
FIG. 2 is a timing diagram of a transmit error detection process in accordance with one or more embodiments.

FIG. 2 is a timing diagram of a transmission 200 by serial communication link receiver-transmitter 100 that includes automatic error detection performed by an autonomous hardware module (e.g., serial communication link receiver-transmitter 100 of FIG. 1), in accordance with one or more embodiments. Time units are defined by vertical dashed lines, and each time unit corresponds substantially to a clock cycle. In the specific example depicted by FIG. 2, transmitted data frame 116 (at transmit shift register 112) and a frame of observed transmitted data frame 154 (at receive shift register 138) are each defined between time 206 and time 210.

At time 204, transmit data 106 has been received at transmit data register 108 via transmitter input 104. Data is arbitrarily denoted by FIG. 2 using the convenient label "0x55," which is not intended to limit this disclosure.

At time 206 (here, one clock cycle after time 204), transmit shift register 112 has received transmit data 106, and in parallel, comparison register 124 has received observed transmit data 110. Transmit shift register 112 begins to shift-out transmitted data frame 116 to transmit pad 118 via transmitter output 114, one bit at a time. Signals depicted by FIG. 2 at transmit pad 118 are the bits of transmitted data frame 116 at transmit pad 118. Signals depicted by FIG. 2 at receiver input 136 are the bits shifted in to receive shift register 138, namely, bits of observed transmitted data frame 154.

Notably, at time 208, an erred bit 202 is present in observed transmitted data 144 of observed transmitted data frame 154 that is received at receiver input 136, and the erred bit 202 is shifted-in by receive shift register 138.

At time 210, reception complete indicator 148 is asserted (e.g., pulsed, without limitation), which corresponds to reception of an end of observed transmitted data frame 154 (e.g., reception of an end of frame indicator such as an end of frame bit, without imitation), where the last bit of transmitted data frame 116 is shifted-out of transmit shift register 112 and the last bit of observed transmitted data frame 154 is shifted-in to receive shift register 138. Observed transmitted data 144 (i.e., a data portion of observed transmitted data frame 154) is moved to receive buffer 140 immediately after reception, or with negligible delay—here moved in a single clock cycle, therefore appearing in receive buffer 140 after time 210 with the erred bit 202 resulting in a different value than transmit data 106.

Notably, the hexadecimal value of transmit data 106 that is included in transmit data 106, and received at comparison register 124 as observed transmit data 110, is depicted as 0x55 at comparison register 124 and the hexadecimal value of observed transmitted data 144 that is included in observed transmitted data frame 154 is depicted as 0x45 at receive buffer 140. At time 210, and in response to assertion of reception complete indicator 148, the contents of comparison register 124 and receive buffer 140 are compared by error detection logic 126. At time 210, transmit error indicator 132 is asserted in response to the aforementioned comparison revealing that the contents of receive buffer 140 and comparison register 124 are different, and more specifically, that observed transmit data 110 and observed transmitted data 144 are different due to observed transmitted data frame 154 including erred bit 202.

In one or more embodiments, an entire frame of transmit data may be compared to an entire frame of observed transmitted data or just the data portions of the frames may be compared. As a non-limiting example, data bits, a start bit, a stop bit, a parity bit, and combinations thereof may be compared. In some embodiments, content of a subset of parts of a frame may be compared, including one or more of control bits, a source and/or destination address, start/stop bits, data bits, error detection bits, and error correction bits, without limitation. Since the construct of a data frame will typically be known in advance, the bits at receive buffer 140 and comparison register 124 that correspond to each part of a frame that is desired to be compared may be coupled to error detection logic 126.

Figure 3:
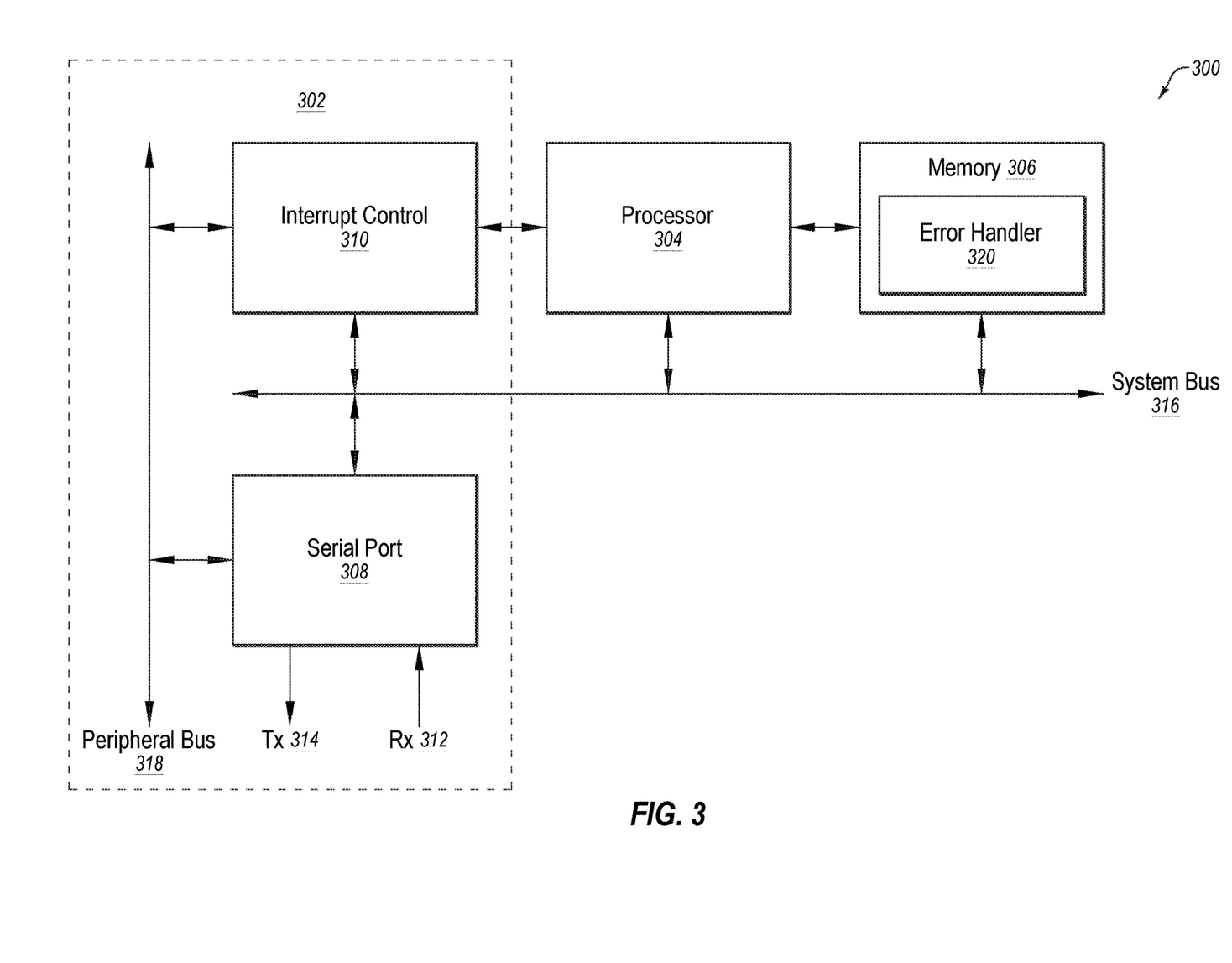
FIG. 3 is a block diagram of a microcontroller system configured to implement an error detection process in accordance with one or more embodiments.

FIG. 3 is a block diagram depicting a microcontroller system 300 configured to detect transmit errors on a transmit line, in accordance with one or more embodiments. In the specific embodiment depicted by FIG. 3, microcontroller system 300 includes processor 304, memory 306 and peripherals 302 that can communicate over system bus 316. Peripherals 302 may include any number of peripherals configured to perform various tasks and operations of microcontroller system 300 and may include serial port 308, interrupt control 310, and peripheral bus 318.

As depicted in FIG. 3, peripherals 302 includes serial port 308 and interrupt control 310, which can communicate over peripheral bus 318. Serial port 308 may include one or more communication peripherals that are configured as a serial communication link receiver-transmitter 100 for forming and performing serial communication via transmission communication link 314 and reception communication link 312. Transmission communication link 314 and reception communication link 312 may include one or more lines for conveying data frames. Transmission may be performed with error detection as discussed herein.

Interrupt control 310 may be one of peripherals 302 configured to assert interrupts at processor 304. In a case of transmit error detection in accordance with disclosed embodiments, interrupt control 310 may be alerted (e.g., by transmit error indicator 132 of FIG. 1) via peripheral bus 318 and configured to assert an interrupt at processor 304 via system bus 316 in response to detection of a transmit error at serial port 308.

Upon receiving an interrupt, processor 304 may run error handler 320, which may, among other things, control resend of transmit data together with an error frame, log the error, notify a user of serial port 308, i.e., of communication peripheral 100 (e.g., an application being run at microcontroller system 300, without limitation), that a transmission error occurred, or combinations thereof, without limitation.

Notably, a serial port 308 that includes a serial communication link receiver-transmitter 100 may perform ongoing transmit error monitoring and detection in accordance with disclosed embodiments autonomously, without interrupting processor 304, until an error is detected. By way of non-limiting example, processor 304 may perform a main function or control loop, be available, or be in a low power mode (e.g., sleeping, without limitation), while transmit data is being monitored for errors autonomously by serial port 308. Until the transmit error indicator 132 is asserted and interrupt control 310 asserts an interrupt at processor 304, the CPU is unaffected by an error monitoring and detection process being performed at serial port 308.

Some conventional transmit error detection processes known to the inventor of this disclosure are implemented in software of a microcontroller (e.g., firmware stored in a RAM, ROM, or Flash Memory, without limitation), and a CPU performs some or all of the operations of such transmit error detection. In such conventional systems, the CPU is not available for other processes and consumes power. Various embodiments of this disclosure may improve and/or overcome some of the disadvantages of this and other conventional transmit error processes. Moreover, in such conventional systems, the error detection is actually to detect a collision or potential collision on a line and not necessarily to detect an erred bit or bits.

Figure 4:
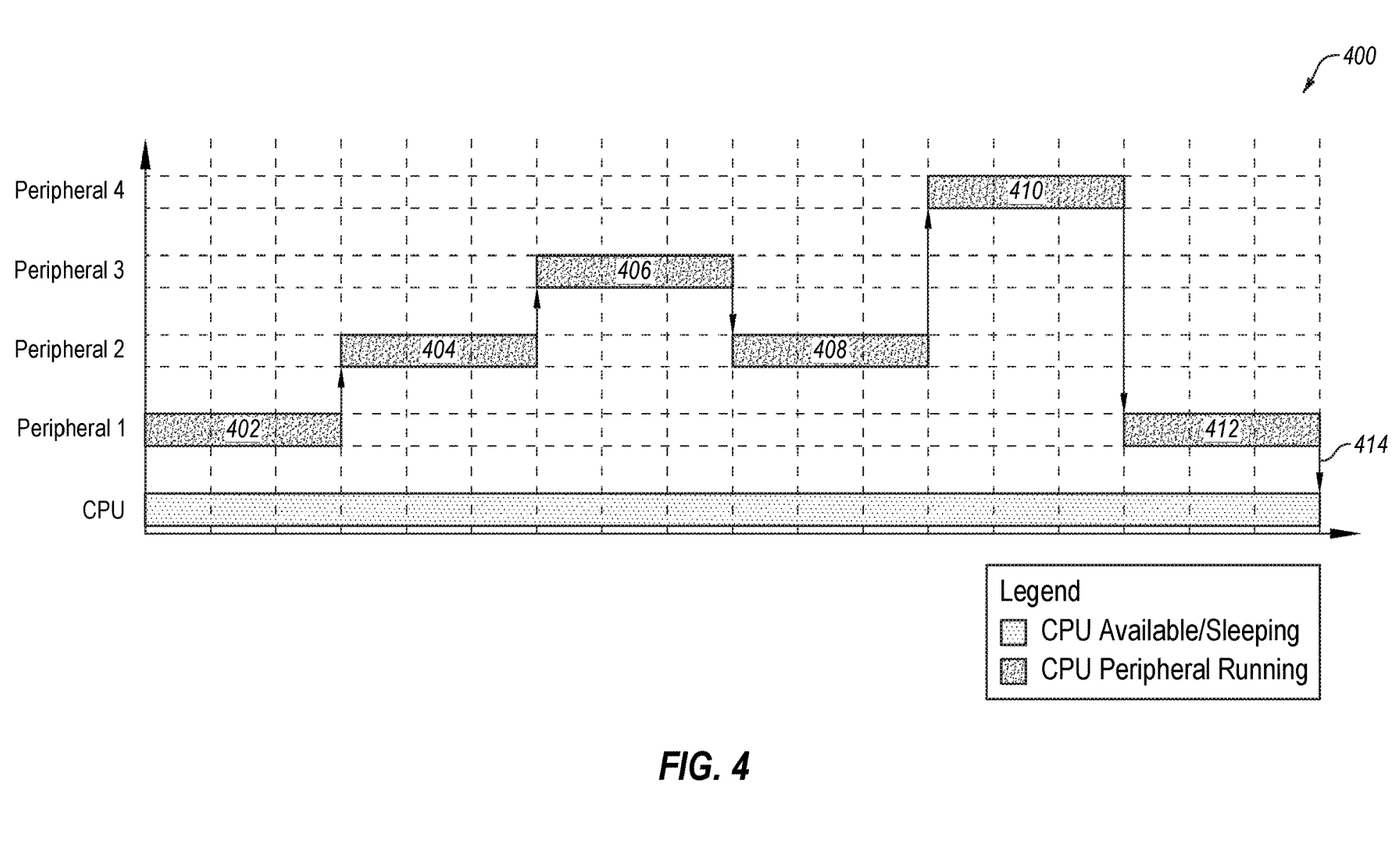
FIG. 4 is a timing diagram of a specific example of an operation of a microcontroller system during which a transmit error flag is asserted in response to an error detection process in accordance with one or more embodiments.

FIG. 4 is a timing diagram that depicts an example of an operation 400 of a microcontroller system 300, and during the operation 400 peripheral 1 detects a transmit error.

In the specific example depicted in FIG. 4, peripheral 1 is a serial communication link receiver-transmitter 100 of serial port 308. In block 402, Peripheral 1 receives a block of data (e.g., on reception communication link 312, without limitation). The data is then passed directly to Peripheral 2 which, in block 404, acts on the data and then passes a result of the acts performed in block 404 to Peripheral 3, which, in block 406, acts on the results of block 404 and then passes the results of block 406 to Peripheral 2. Peripheral 2, in block 408, acts on the result of block 406, and then passes the results of block 408 to Peripheral 4, which in block 410 acts on the result of block 408 and then passes the result of block 410 to Peripheral 1. In block 412, Peripheral 1 receives the result of block 410 and transmits the result. In block 412, Peripheral 1 transmits the computed response based on the acts performed in blocks 402, 404, 406, 408, and 410 by the other peripherals. During block 412, Peripheral 1 performs an error detection process and detects an error in the transmitted computed response and asserts interrupt 414 to notify the CPU that the transmission did not transmit successfully (TXERR indicator).

Notably, during the acts performed during blocks 402, 404, 406, 408, 410 and 412, the CPU in this specific example is available to perform other processes and/or sleeping (i.e., low power mode).

Figure 5:
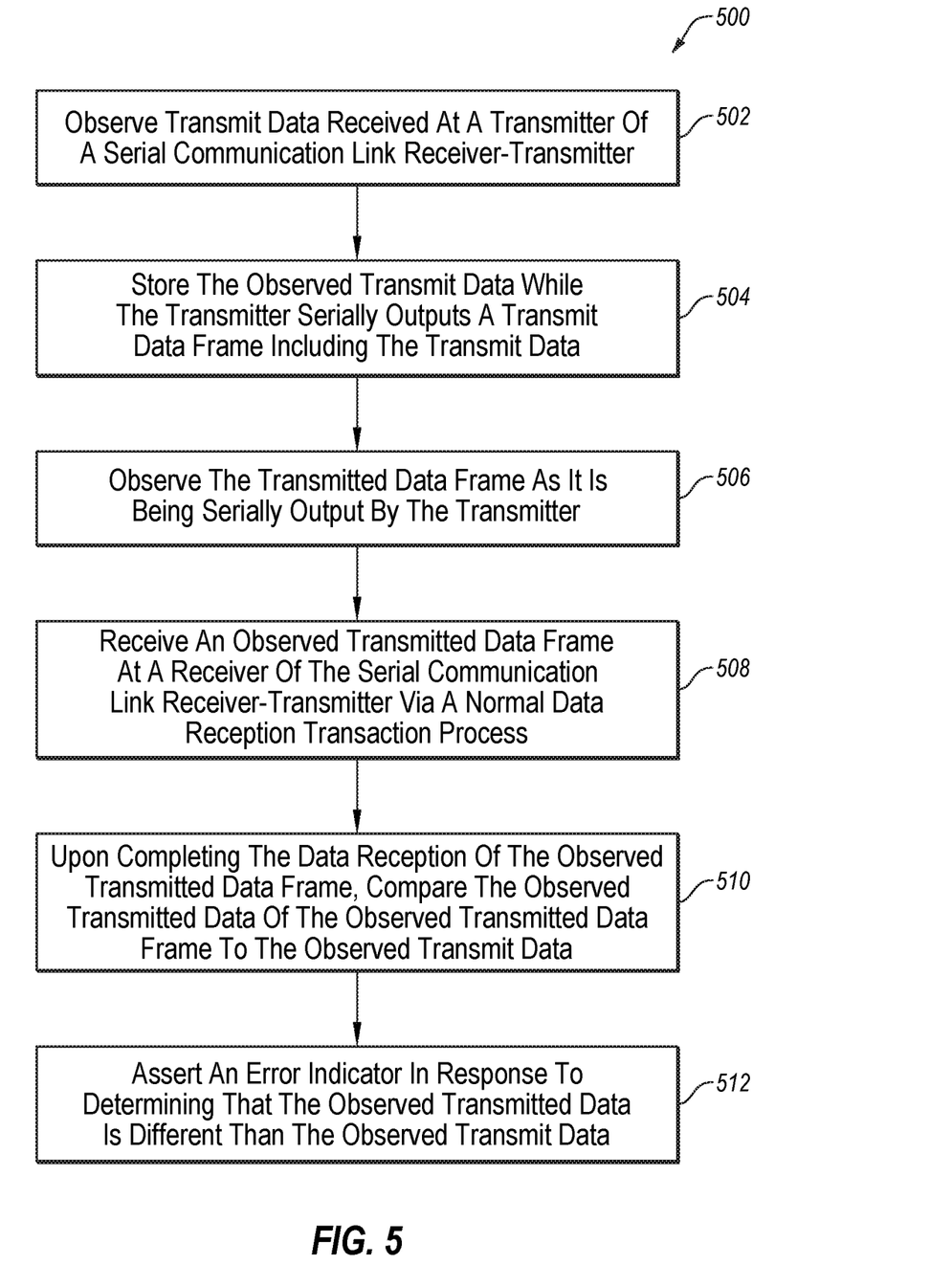
FIG. 5 illustrates a process 500 in accordance with one embodiment.

FIG. 5 is a flowchart depicting a process 500 for detecting a transmission error in a serial communication link receiver-transmitter in accordance with one or more embodiments.

In operation 502, process 500 observes a transmit data received at a transmitter of a serial communication link receiver-transmitter.

In operation 504, process 500 stores the observed transmit data while the transmitter serially outputs a transmit data frame, where the transmit data frame includes the received transmit data. In one embodiment, process 500 stores the observed transmit data in a parallel fashion, in one clock cycle.

In operation 506, process 500 observes a transmitted data frame as it's being serially output by the transmitter.

In operation 508, process 500 receives the observed transmitted data frame at a receiver of the serial communication link receiver-transmitter. As a non-limiting example, the observed transmitted data frame may be received via a data reception transaction process of the receiver. The data portion of the observed frame of transmitted data is stored in a data buffer as observed transmitted data 144.

In operation 510, upon completing the data reception of the observed transmitted data frame, process 500 compares the observed transmitted data of the observed transmitted data frame to the observed transmit data.

In operation 512, process 500 asserts an error indicator in response to determining that the observed transmitted data is different than the observed transmit data. An error indicator is not asserted in response to determining that the observed transmitted data is not different than the observed transmit data.

Figure 6:
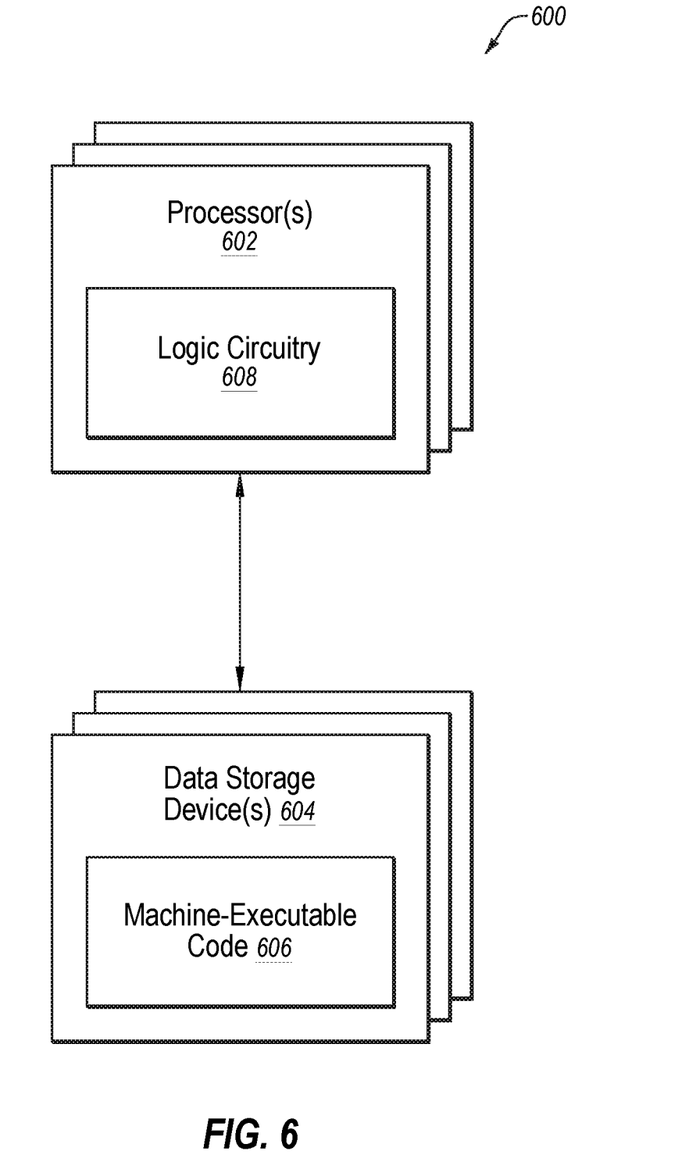
FIG. 6 illustrates a circuitry 600 in accordance with one embodiment.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 6 illustrates non-limiting examples of implementations of functional elements disclosed herein. In some embodiments, some or all portions of the functional elements disclosed herein may be performed by hardware specially configured for carrying out the functional elements.

FIG. 6 is a block diagram of circuitry 600 that, in some embodiments, may be used to implement various functions, operations, acts, processes, and/or methods disclosed herein. The circuitry 600 includes one or more processors 602 (sometimes referred to herein as "processors 602") operably coupled to one or more data storage devices (sometimes referred to herein as "storage 604"). The storage 604 includes machine-executable code 606 stored thereon and the processors 602 include logic circuitry 608. The machine-executable code 606 includes information describing functional elements that may be implemented by (e.g., performed by) the logic circuitry 608. The logic circuitry 608 is adapted to implement (e.g., perform) the functional elements described by the machine-executable code 606. The circuitry 600, when executing the functional elements described by the machine-executable code 606, should be considered as special purpose hardware configured for carrying out functional elements disclosed herein. In some embodiments the processors 602 may be configured to perform the functional elements described by the machine-executable code 606 sequentially, concurrently (e.g., on one or more different hardware platforms), or in one or more parallel process streams.

When implemented by logic circuitry 608 of the processors 602, the machine-executable code 606 is configured to adapt the processors 602 to perform operations of embodiments disclosed herein. For example, the machine-executable code 606 may be configured to adapt the processors 602 (e.g., a peripheral processor, without limitation) to perform at least a portion or a totality of the processes of process 500 and discussed in connection with transmission 200. As another example, the machine-executable code 606 may be configured to adapt the processors 602 to perform at least a portion or a totality of the operations discussed for serial communication link receiver-transmitter 100, transmitter 102, error detector 122, and receiver 134 of FIG. 1; and microcontroller system 300, serial port 308, interrupt control 310, and peripheral bus 318 of FIG. 3. As another example, machine-executable code 606 may be configured to adapt other processors of processors 602 (e.g., a processor of a microcontroller or an embedded system, without limitation) to perform at least a portion or a totality of the operations discussed for processor 304, error handler 320 and system bus 316 of FIG. 3.

The processors 602 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 606 (e.g., software code, firmware code, hardware descriptions) related to embodiments of the present disclosure. It is noted that a general-purpose processor (may also be referred to herein as a host processor or simply a host) may be a microprocessor, but in the alternative, the processors 602 may include any conventional processor, controller, microcontroller, or state machine. The processors 602 may also be implemented as a combination of computing devices, such as a combination of a DSP and a microprocessor, a plurality of microprocessors, one or more microprocessors in conjunction with a DSP core, or any other such configuration.

In some embodiments the storage 604 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 602 and the storage 604 may be implemented into a single device (e.g., a semiconductor device product, a system on chip (SOC), etc.). In some embodiments the processors 602 and the storage 604 may be implemented into separate devices.

In some embodiments the machine-executable code 606 may include computer-readable instructions (e.g., software code, firmware code). By way of non-limiting example, the computer-readable instructions may be stored by the storage 604, accessed directly by the processors 602, and executed by the processors 602 using at least the logic circuitry 608. Also by way of non-limiting example, the computer-readable instructions may be stored on the storage 604, transferred to a memory device (not shown) for execution, and executed by the processors 602 using at least the logic circuitry 608. Accordingly, in some embodiments the logic circuitry 608 includes electrically configurable logic circuitry 608.

In some embodiments the machine-executable code 606 may describe hardware (e.g., circuitry) to be implemented in the logic circuitry 608 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, System-Verilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 608 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine-executable code 606 may include an HDL, an RTL, a GL description, a mask level description, other hardware description, or any combination thereof.

In embodiments where the machine-executable code 606 includes a hardware description (at any level of abstraction), a system (not shown, but including the storage 604) may be configured to implement the hardware description described by the machine-executable code 606. By way of non-limiting example, the processors 602 may include a programmable logic device (e.g., an FPGA or a PLC, without limitation) and the logic circuitry 608 may be electrically controlled to implement circuitry corresponding to the hardware description into the logic circuitry 608. Also by way of non-limiting example, the logic circuitry 608 may include hard-wired logic manufactured by a manufacturing system (not shown, but including the storage 604) according to the hardware description of the machine-executable code 606. Such manufacturing of hard-wired logic may also be characterized herein as permanently configuring logic circuitry of a processor.

Regardless of whether the machine-executable code 606 includes computer-readable instructions or a hardware description, the logic circuitry 608 is adapted to perform the functional elements described by the machine-executable code 606 when implementing the functional elements of the machine-executable code 606. It is noted that although a hardware description may not directly describe functional elements, a hardware description indirectly describes functional elements that the hardware elements described by the hardware description are capable of performing.

Any characterization in this disclosure of something as "typical," "conventional," or "known" does not necessarily mean that it is disclosed in the prior art or that the discussed aspects are appreciated in the prior art. Nor does it necessarily mean that, in the relevant field, it is widely known, well-understood, or routinely used.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, without limitation) of the computing system. In some embodiments, the different components, modules, engines, and services described in the present disclosure may be implemented as objects or processes that execute on the computing system (e.g., as separate threads, without limitation). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different subcombinations of some of the elements. For example, the phrase "A, B, C, D, or combinations thereof" may refer to any one of A, B, C, or D; the combination of each of A, B, C, and D; and any subcombination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims, without limitation) are generally intended as "open" terms (e.g., the term "including" should be interpreted as "including, but not limited to," the term "having" should be interpreted as "having at least," the term "includes" should be interpreted as "includes, but is not limited to," without limitation). As used herein, the term "each" means some or a totality. As used herein, the term "each and every" means a totality.

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting embodiments of the disclosure include:

Embodiment 1: a serial communication link receiver-transmitter, comprising: a transmitter and a receiver configured to perform data transmission and data reception, respectively, at a same side of a serial communication link; and an error detector operatively coupled to the transmitter and receiver, the error detector configured to provide a transmit error indication responsive to a difference between transmit data received at the transmitter and transmitted data output by the transmitter.

Embodiment 2: the serial communication link receiver-transmitter according to Embodiment 1, wherein the error detector comprises: a transmit error indicator; a comparison register; and an error detection logic comprising: a first input operatively coupled to the comparison register; a second input operatively coupled to a memory of the receiver; and an output operatively coupled to the transmit error indicator.

Embodiment 3: the serial communication link receiver-transmitter according to any of Embodiments 1 and 2, wherein an enable input of the error detection logic is coupled to a reception complete indicator of the receiver.

Embodiment 4: the serial communication link receiver-transmitter according to any of Embodiments 1 through 3, wherein the transmitter comprises a data buffer operatively coupled to the error detector.

Embodiment 5: the serial communication link receiver-transmitter according to any of Embodiments 1 through 4, wherein the error detector is arranged to observe transmit data provided to a transmit shift register and configured to store an observed transmit data.

Embodiment 6: the serial communication link receiver-transmitter according to any of Embodiments 1 through 5, wherein an output of the transmitter is operatively coupled to an output pad and operatively coupled to an input of the receiver.

Embodiment 7: the serial communication link receiver-transmitter according to any of Embodiments 1 through 6, wherein the receiver is configured to receive an observed transmitted data frame and obtain an observed transmitted data of the observed transmitted data frame.

Embodiment 8: the serial communication link receiver-transmitter according to any of Embodiments 1 through 7, further comprising: a selection circuitry configured to alternately couple and de-couple an input of the receiver to an output of the transmitter responsive to a selection signal, the selection signal generated in response to enablement/de-enablement of the error detector.

Embodiment 9: the serial communication link receiver-transmitter according to any of Embodiments 1 through 8, further comprising: a selection circuitry configured to alternately couple and de-couple an input of the receiver to an input pad responsive to a selection signal, the selection signal generated in response to enablement/de-enablement of the error detector.

Embodiment 10: a method of detecting a transmission error in a transmitted data frame on a serial communication link, the method comprising: serially outputting a transmitted data frame including transmit data; and asserting an error indicator responsive to determining that an observed transmitted data is different than an observed transmit data.

Embodiment 11: the method according to Embodiment 10, further comprising: observing transmit data at a transmitter of a serial communication link receiver-transmitter.

Embodiment 12: The method according to any of Embodiments 10 and 11, further comprising: observing a transmitted data frame serially output by the transmitter.

Embodiment 13: the method according to any of Embodiments 10 through 12, further comprising: receiving an observed transmitted data at a receiver of a serial communication link receiver-transmitter according to a data reception transaction process of a receiver.

Embodiment 14: the method according to any of Embodiments 10 through 13, further comprising: upon completing the normal data reception process of the observed transmitted data, comparing the observed transmitted data of the observed transmitted data frame to the observed transmit data.

Embodiment 15: the method according to any of Embodiments 10 through 14, further comprising: comparing an observed transmitted data and the observed transmit data; and determining that the observed transmitted data is different than the observed transmit data responsive to the comparing.

Embodiment 16: a computing system, comprising: a processor; and a memory storage having thereon machine-executable code adapted to permanently configure logic circuitry of the processor to: observe a transmit data received for transmission by a transmitter of a serial communication link; serially output a transmit data frame including transmitted data; observe the transmitted data of the transmit data frame; and assert an error indicator responsive to determining that the observed transmitted data is different than an observed transmit data.

Embodiment 17: the computing system according to Embodiment 16, wherein the machine-executable code include code adapted to permanently configure logic circuitry of the processor to: observe transmit data at a transmitter of a serial communication link receiver-transmitter.

Embodiment 18: the computing system according to any of Embodiments 16 and 17, wherein the machine-executable code include code adapted to permanently configure logic circuitry of the processor to: observe a transmitted data frame serially output by the transmitter.

Embodiment 19: the computing system according to any of Embodiments 16 through 18, wherein the machine-executable code include code adapted to permanently configure logic circuitry of the processor to: receive the observed transmitted data frame at a receiver of a serial communication link receiver-transmitter according to a data reception transaction process of the receiver.

Embodiment 20: the computing system according to any of Embodiments 16 through 19, wherein the machine-executable code include code adapted to permanently configure logic circuitry of the processor to: upon completing the data reception process of the observed transmitted data frame, comparing the observed transmitted data of the observed transmitted data frame to the observed transmit data.

Embodiment 21: the computing system according to any of Embodiments 16 through 20, wherein the machine-executable code include code adapted to permanently configure logic circuitry of the processor to: compare an observed transmitted data and the observed transmit data; and determining that the observed transmitted data is different than the observed transmit data responsive to the comparing.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An apparatus, comprising:
a transmitter and a receiver for data transmission and data reception, respectively, at a same side of a serial communication link; and
an error detector operatively coupled to the transmitter and receiver, the error detector to provide, during a normal data transmission mode of the transmitter and a normal data reception mode of the receiver, a transmit error indication responsive to a difference between transmit data received at the transmitter and transmitted data output by the transmitter.

2. The apparatus of claim 1, wherein the error detector comprises:
a transmit error indicator;
a comparison register; and
an error detection logic comprising:
a first input operatively coupled to the comparison register;
a second input operatively coupled to a memory of the receiver; and
an output operatively coupled to the transmit error indicator.

3. The apparatus of claim 2, wherein an enable input of the error detection logic is coupled to a reception complete indicator of the receiver.

4. The apparatus of claim 1, wherein the transmitter comprises a data buffer operatively coupled to the error detector.

5. The apparatus of claim 4, wherein the error detector is arranged to observe transmit data provided to a transmit shift register and to store an observed transmit data.

6. The apparatus of claim 1, wherein an output of the transmitter is operatively coupled to an output pad and operatively coupled to an input of the receiver.

7. The apparatus of claim 6, wherein the receiver is to receive an observed transmitted data frame and obtain an observed transmitted data of the observed transmitted data frame.

8. The apparatus of claim 1, comprising: a selection circuitry to alternately couple and de-couple an input of the receiver to an output of the transmitter responsive to a selection signal, the selection signal generated in response to enablement/de-enablement of the error detector.

9. The apparatus of claim 1, comprising: a selection circuitry to alternately couple and de-couple an input of the receiver to an input pad responsive to a selection signal, the selection signal generated in response to enablement/de-enablement of the error detector.

10. A method the comprising:
during a normal data transmission mode of a transmitter and a normal data reception mode of a receiver, respectively of a same side of a serial communication link, serially outputting a transmitted data frame including transmit data; and asserting an error indicator responsive to determining that an observed transmitted data is different than an observed transmit data.

11. The method claim 10, comprising:

observing transmit data at a transmitter of a serial communication link receiver-transmitter.

12. The method of claim 10, comprising: observing the transmitted data frame serially output by a transmitter.

13. The method of claim 10, comprising:

receiving an observed transmitted data at a receiver of a serial communication link receiver-transmitter according to a data reception transaction process of a receiver.

14. The method of claim 13, comprising:

upon completing the normal data reception transaction process of the observed transmitted data, comparing the observed transmitted data of the observed transmitted data frame to the observed transmit data.

15. The method of claim 10, comprising: comparing an observed transmitted data and the observed transmit data; and determining that the observed transmitted data is different than the observed transmit data responsive to the comparing.

16. A system, comprising:

a processor; and a memory storage having thereon machine-executable code adapted to permanently configure logic circuitry of the processor to:

observe a transmit data received for transmission by a transmitter of a serial communication link;

during a normal data transmission mode of a transmitter and a normal data reception mode of a receiver, respectively of a same side of a serial communication link, serially output a transmit data frame including transmitted data;

observe the transmitted data of the transmit data frame; and assert an error indicator responsive to determining that the observed transmitted data is different than an observed transmit data.

17. The system of claim 16, wherein the machine-executable code includes code adapted to permanently configure logic circuitry of the processor to:

observe transmit data at a transmitter of a serial communication link receiver-transmitter.

18. The system of claim 17, wherein the machine-executable code includes code adapted to permanently configure logic circuitry of the processor to: observe a transmitted data frame serially output by the transmitter.

19. The system of claim 16, wherein the machine-executable code includes code adapted to permanently configure logic circuitry of the processor to:

receive the observed transmitted data of the transmit data frame at a receiver of a serial communication link receiver-transmitter according to a data reception transaction process of the receiver.

20. The system of claim 19, wherein the machine-executable code includes code adapted to permanently configure logic circuitry of the processor to:

upon completing the data reception transaction process of the observed transmitted data frame, compare the observed transmitted data of the transmitted data frame to the observed transmit data.

21. The system of claim 19, wherein the machine-executable code includes code adapted to permanently configure logic circuitry of the processor to:

compare the observed transmitted data and the observed transmit data; and determining that the observed transmitted data is different than the observed transmit data responsive to the comparing.

* * * * *